US012777112B2

(12) United States Patent
Zhang et al.

(10) Patent No.: US 12,777,112 B2
(45) Date of Patent: Oct. 27, 2026

(54) ELECTRONIC DEVICE

(71) Applicant: VIVO MOBILE COMMUNICATION CO., LTD., Guangdong (CN)

(72) Inventors: Fuyin Zhang, Guangdong (CN); Kai Huang, Guangdong (CN); Shuanghua Zhang, Guangdong (CN); Zhiwei Wang, Guangdong (CN); Huasheng Zhu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 310 days.

(21) Appl. No.: 18/588,627

(22) Filed: Feb. 27, 2024

(65) Prior Publication Data

US 2024/0205319 A1 Jun. 20, 2024

Related U.S. Application Data

(63) Continuation of application No. PCT/CN2022/113909, filed on Aug. 22, 2022.

(30) Foreign Application Priority Data

Aug. 27, 2021 (CN) ........................ 202110998169.0

(51) Int. Cl.
*H04M 1/02* (2006.01)
*G06V 40/13* (2022.01)

(52) U.S. Cl.
CPC ...... *H04M 1/0277* (2013.01); *G06V 40/1306* (2022.01); *H04M 1/0268* (2013.01); *H04M 2250/22* (2013.01)

(58) Field of Classification Search
CPC ............. H04M 1/0277; H04M 1/0268; H04M 2250/22; H04M 1/026; H04M 1/0266;
(Continued)

(56) References Cited

U.S. PATENT DOCUMENTS

2020/0134278 A1 4/2020 Lee et al.
2020/0143134 A1* 5/2020 Wang ..................... H10K 59/65
2020/0394377 A1 12/2020 Jang et al.

FOREIGN PATENT DOCUMENTS

CN 108418918 A 8/2018
CN 208240683 U 12/2018
(Continued)

OTHER PUBLICATIONS

First Office Action for Chinese Application No. 202110998169.0, dated Oct. 13, 2023, 9 Pages.
(Continued)

*Primary Examiner* — Curtis A Kuntz
(74) *Attorney, Agent, or Firm* — BROOKS KUSHMAN P.C.

(57) ABSTRACT

An electronic device, including a screen component, a functional component, and a device body. The screen component is superposed and installed on the device body, and a first hollowed-out region is provided on the screen component. The functional component is disposed in the device body, and the functional component faces the first hollowed-out region. An orthographic projection of the first hollowed-out region in a thickness direction of the electronic device is capable of accommodating at least two of the functional components.

8 Claims, 7 Drawing Sheets

(58) Field of Classification Search
CPC .. H04M 1/0279; G06V 40/1306; G06V 40/13
See application file for complete search history.

(56) References Cited

FOREIGN PATENT DOCUMENTS

| | | | |
|---|---|---|---|
| CN | 209785029 | U | 12/2019 |
| CN | 111049961 | A | 4/2020 |
| CN | 211349376 | U | 8/2020 |
| CN | 211349377 | U | 8/2020 |
| CN | 111756883 | A | 10/2020 |
| CN | 111984064 | A | 11/2020 |
| CN | 112995373 | A | 6/2021 |
| CN | 113691661 | A | 11/2021 |
| WO | 2020105767 | A1 | 5/2020 |

OTHER PUBLICATIONS

Extended European Search Report for Application No. 22860435.1, Nov. 15, 2024, 7 Pages.
International Search Report and Written Opinion for Application No. PCT/CN2022/113909, dated Nov. 11, 2022, 7 Pages.

* cited by examiner

ELECTRONIC DEVICE

CROSS-REFERENCE TO RELATED APPLICATIONS

This application is a continuation of International Application No. PCT/CN2022/113909 filed on Aug. 22, 2022, which claims priority to Chinese Patent Application No. 202110998169.0 filed on Aug. 27, 2021, which are incorporated herein by reference in their entireties.

TECHNICAL FIELD

This application relates to the technical field of electronic devices, and in particular, to an electronic device.

BACKGROUND

In conventional technologies, to meet requirements of users, various functional components are disposed behind screens of electronic devices, such as a fingerprint unlocking component and a camera. To meet use requirements for these components, non-transparent layers at corresponding positions on the screens need to be removed, to reserve installation positions for these functional components.

It can be predicted that a variety of functional components are provided for the electronic devices, and the electronic devices are laid out in different manners. Taking mobile phones as an example, types and disposing positions of internal functional components provided in the mobile phones of different specifications and models are inevitably different. In this way, a plurality of sets of screens need to be developed. Specifically, installation regions of different sizes and at different positions are reserved for these screens to match functional components in different combination manners.

It can be learned that in the conventional technologies, only one type of a functional component can be matched for the screen, which causes poor compatibility of the electronic device, and increases development costs for the electronic device.

SUMMARY

The present invention provides an electronic device.

According to a first aspect, this application discloses an electronic device, including a screen component, a functional component, and a device body. The screen component is superposed and installed on the device body, and a first hollowed-out region is provided on the screen component. The functional component is disposed in the device body, and the functional component faces the first hollowed-out region. An orthographic projection of the first hollowed-out region in a thickness direction of the electronic device is capable of accommodating at least two of the functional components.

BRIEF DESCRIPTION OF DRAWINGS

The accompanying drawings described herein are intended to provide a further understanding of this application, and constitute a part of this application. Example embodiments of this application and descriptions thereof are intended to describe this application, and do not constitute limitations on this application. In the accompanying drawings.

REFERENCE NUMERALS

Figure 1:
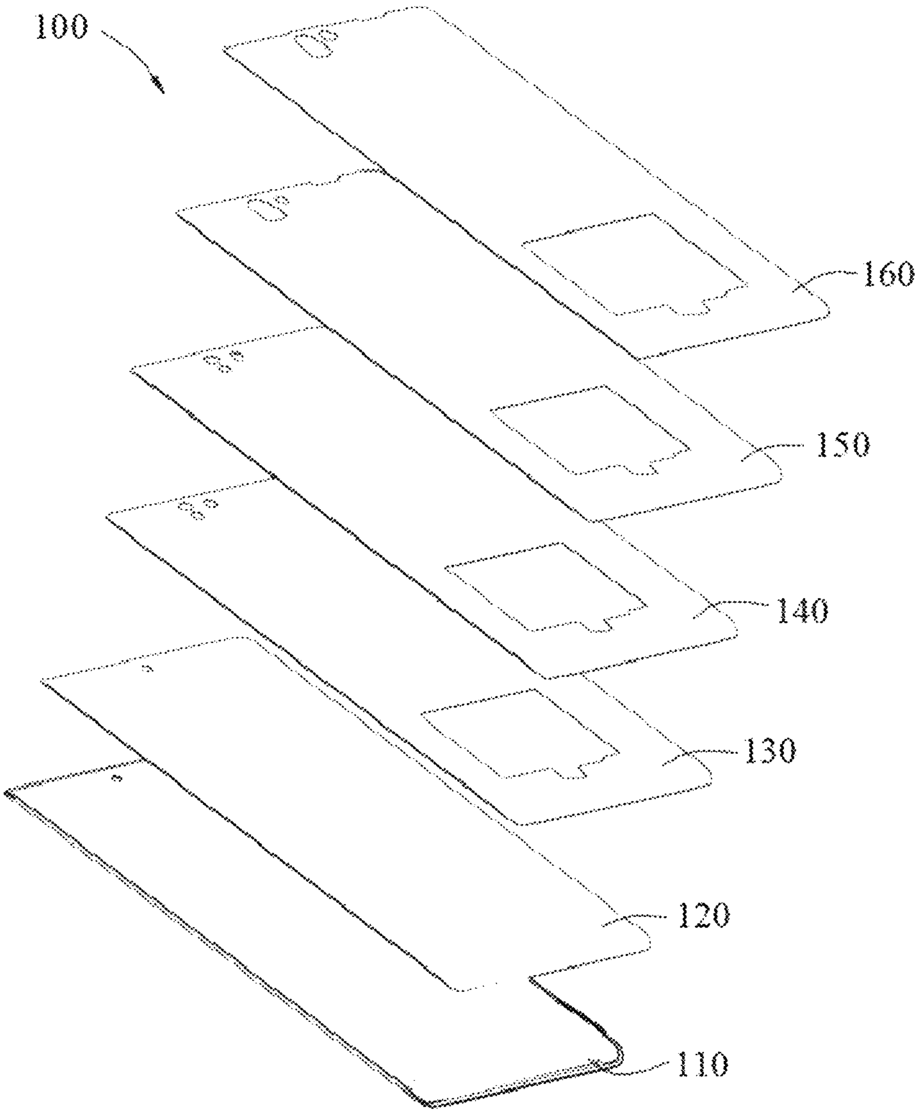
FIG. 1 is an exploded view of a screen component according to one of embodiments of the present invention.

100—screen component,
110—cover plate layer, 120—touch layer, 130, 140—bonding layers, 150—support layer, 160—heat dissipation layer,
200—first hollowed-out region,
210—first sub-region, 220—second sub-region, 201—first sealing edge,
300—ultrasonic fingerprint module,
400—blocking component,
410—second protective layer, 420—second blocking layer, 401—second sealing edge, 403—avoidance hole,
500—optical fingerprint module,
600—device body, 700—second hollowed-out region, 800—screen component FPC,
900—release film,
901—positioning hole, 902—strong/weak adhesive, 903—disassembly line.

DETAILED DESCRIPTION

To make the objectives, technical solutions, and advantages of this application clearer, the following clearly describes the technical solutions of this application with reference to specific embodiments and corresponding accompanying drawings of this application. Apparently, the described embodiments are merely some rather than all of embodiments of this application. All other embodiments obtained by a person of ordinary skill in the art based on embodiments of this application without creative efforts shall fall within the protection scope of this application.

Refer to FIG. 1 to FIG. 10. This application discloses an electronic device. The electronic device may be a mobile phone, a tablet computer, an e-book reader, a wearable device (such as a smart watch or smart glasses), or the like. A specific type of the electronic device is not limited in embodiments of this application.

The electronic device may include a screen component 100, a functional component, and a device body 600. The device body 600 may be an installation base for the electronic device and can provide operating electric power for the electronic device. Specifically, the device body 600 may be a housing of the electronic device, and the housing may include a middle frame and a battery cover. The screen component 100 may be superposed and installed on the device body 600, and the screen component 100 is bonded to the device body 600. The functional component may be disposed in the device body 600. A side on which the screen component 100 is located is a display side of the electronic device. The user may observe, by using the screen component 100, image information displayed by the electronic device. A power supply may further be disposed in the device body 600, so that the functional component is electrically connected to the device body 600, to provide operating electric power for the functional component. In this way, the electronic device may implement a corresponding function by using the functional component. For example, the functional component is a component such as a lens or a fingerprint module.

In this application, a first hollowed-out region 200 is provided on a side, facing the device body 600, of the screen component 100. Generally, a side, facing the device body 600, of the screen component 100 is a backlight side, a side, away from the device body 600, of the screen component 100 is a display side, and a part of a material, on the backlight side, of the screen component 100 is dug out to form the first hollowed-out region 200.

The first hollowed-out region 200 is disposed to prevent abnormal interference such as light blocking on and shielding from the functional component, to enable the functional component to effectively implement a corresponding function. In a specific layout manner, the functional component may be disposed facing the first hollowed-out region 200, and an orthographic projection of the first hollowed-out region 200 in a thickness direction of the electronic device may accommodate at least two functional components. The thickness direction is a superposing direction of the screen component 100 and the device body 600.

Optionally, the functional component may be a fingerprint module, a lens, or the like. When the screen component 100 is superposed and installed on the device body 600, the screen component 100 and the device body 600 may cooperate to form an enclosing effect on the functional component, to enable the functional component to be located between the screen component and the device body. In an optional embodiment, the at least two functional components may be disposed in the first hollowed-out region 200, and the at least two functional components face the first hollowed-out region. In this disposing manner, a superposing height is reused for the at least two functional components and the screen component 100, so that internal space of the electronic device is not occupied, and a thickness of the electronic device is reduced. In another optional embodiment, installation space is provided in the device body 600, and the at least two functional components are disposed in the installation space. In this disposing manner, the at least two functional components are located outside the screen component 100 and face the first hollowed-out region 200. The disposing is simpler and easier to operate.

Because the orthographic projection of the first hollowed-out region in the thickness direction of the electronic device can accommodate the at least two functional components, one set of screens may be used to match functional components in different combination manners. This enables the electronic device to have better compatibility performance, reducing development costs for the electronic device. Different combination manners for the functional components mean: a combination of same functional components of different quantities, for example, a combination of two photoelectric fingerprint modules or a combination of three cameras; a combination of different functional components of a same quantity, for example, a combination of one photoelectric fingerprint module and one ultrasonic fingerprint module or a combination of one photoelectric fingerprint module and one camera; or a combination of different functional components of different quantities, for example, a combination of one photoelectric fingerprint module, two ultrasonic fingerprint modules, and one camera module.

Further, the screen component 100 may be a flexible screen component, so that the electronic device can be carried portably in a manner of winding, folding, or the like. The flexible screen component may include a cover plate layer 110, a touch layer 120, a bonding layer 130, a bonding layer 140, a support layer 150, and a heat dissipation layer 160 that are sequentially superposed. The cover plate layer 110 is disposed away from the device body 600. In an embodiment of this application, the touch layer 120, the bonding layer 130, the bonding layer 140, the support layer 150, and the heat dissipation layer 160 are disposed in the device body 600. In another embodiment of this application, the touch layer 120, the bonding layer 130, the bonding layer 140, the support layer 150, and the heat dissipation layer 160 face the device body 600. However, because the heat dissipation layer is in contact with an edge of the device body, the touch layer 120, the bonding layer 130, the bonding layer 140, the support layer 150, and the heat dissipation layer 160 are not disposed in the device body.

The cover plate layer 110 may be a flexible plastic cover plate, to maintain good light transmission performance, and enable a user to observe an image displayed by the electronic device. The touch layer 120 may be manufactured by using a capacitance film layer (P-film) or the like, so that the user performs a contact operation on the electronic device and the electronic device displays content. The bonding layer 130 and the bonding layer 140 may be a laminated combinational structure of an adhesive layer and a foam layer. For example, the bonding layer 130 is the adhesive layer, and the bonding layer 140 is the foam layer. The foam layer may play a role in light blocking and buffer protection, and the adhesive layer plays a connection role. The support layer 150 may support and fasten a shape of the screen component 100 entirely, play a role in insulation and puncture prevention, and may be made of polyimide plastic. The heat dissipation layer 160 may implement heat dissipation and signal shielding and may be made of a material such as copper foil.

The first hollowed-out region 200 may be disposed in the bonding layer 130, the bonding layer 140, the support layer 150, and the heat dissipation layer 160. For example, the functional component is a fingerprint module. The fingerprint module may be disposed in the device body and faces the first hollowed-out region 200. The user may implement a touch operation on the fingerprint module on a side of the cover plate layer 110 by using the touch layer 120, to complete human-computer interaction.

Optionally, the screen component 100 may alternatively be a hard screen. In this disposing manner, the cover plate layer 110 may be a 3D glass cover plate. Similarly, the first hollowed-out region 200 may be disposed in the bonding layer 130, the bonding layer 140, the support layer 150, and the heat dissipation layer 160. Based on different functions that may be implemented by the functional component, the functional component may be disposed in the first hollowed-out region 200, or the functional component is disposed opposite to the first hollowed-out region 200. Details are not described herein.

Further, first through holes may be respectively provided at the bonding layer 130 and the bonding layer 140, a second through hole may be provided at the support layer 150, and a third through hole may be provided at the heat dissipation layer 160. An orthographic projection of the third through hole in the thickness direction of the electronic device may accommodate the first through hole and the second through hole. An area of an orthographic projection of the second through hole in the thickness direction of the electronic device is greater than or equal to an area of an orthographic projection of the first through hole in the thickness direction of the electronic device. The first through hole, the second through hole, and the third through hole are connected and form the first hollowed-out region 200 by enclosing.

Figure 2:
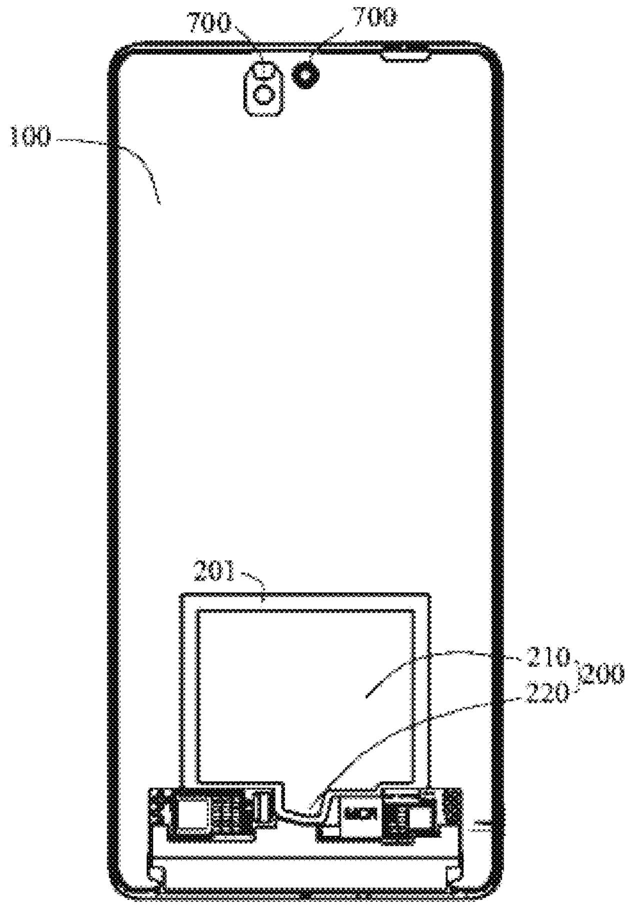
FIG. 2 is a top view of a screen component according to one of embodiments of the present invention.
Figure 3:
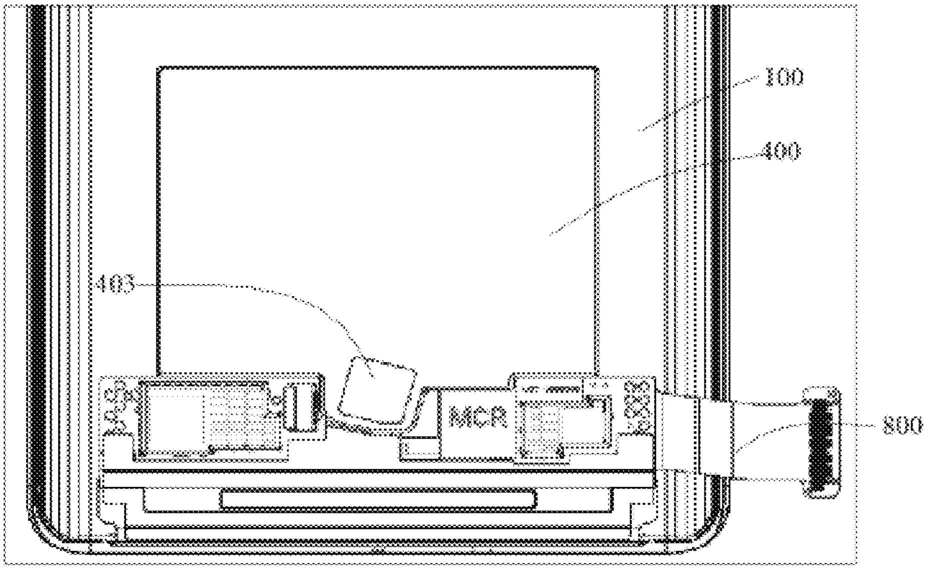
FIG. 3 is a schematic diagram of installing a blocking component when an optical fingerprint module is used according to one of embodiments of the present invention.
Figure 4:
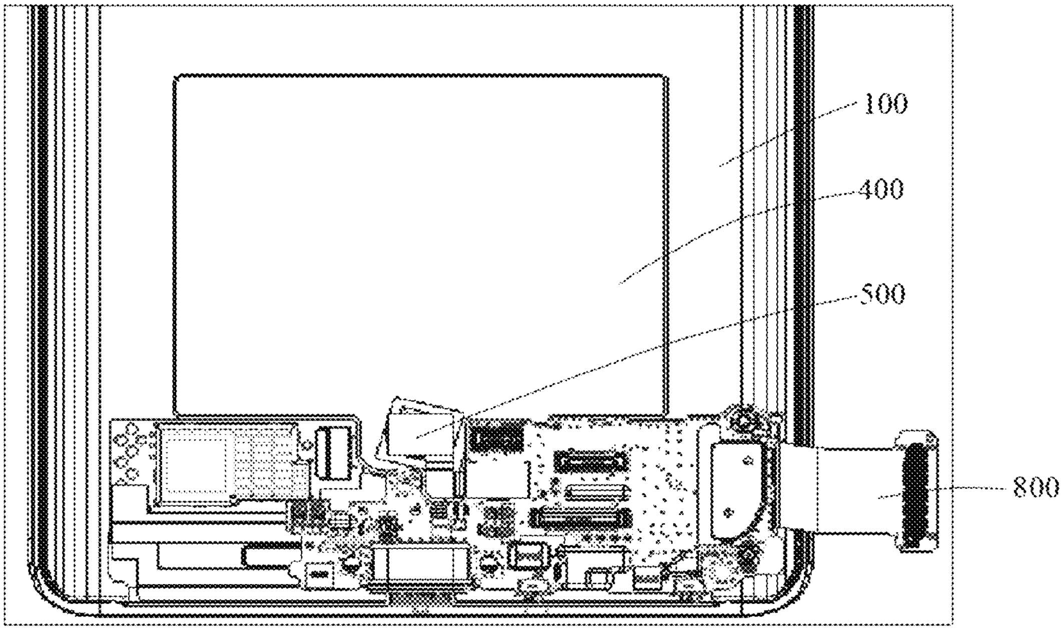
FIG. 4 is a schematic diagram of cooperation between a blocking component and an optical fingerprint module according to one of embodiments of the present invention.
Figure 5:
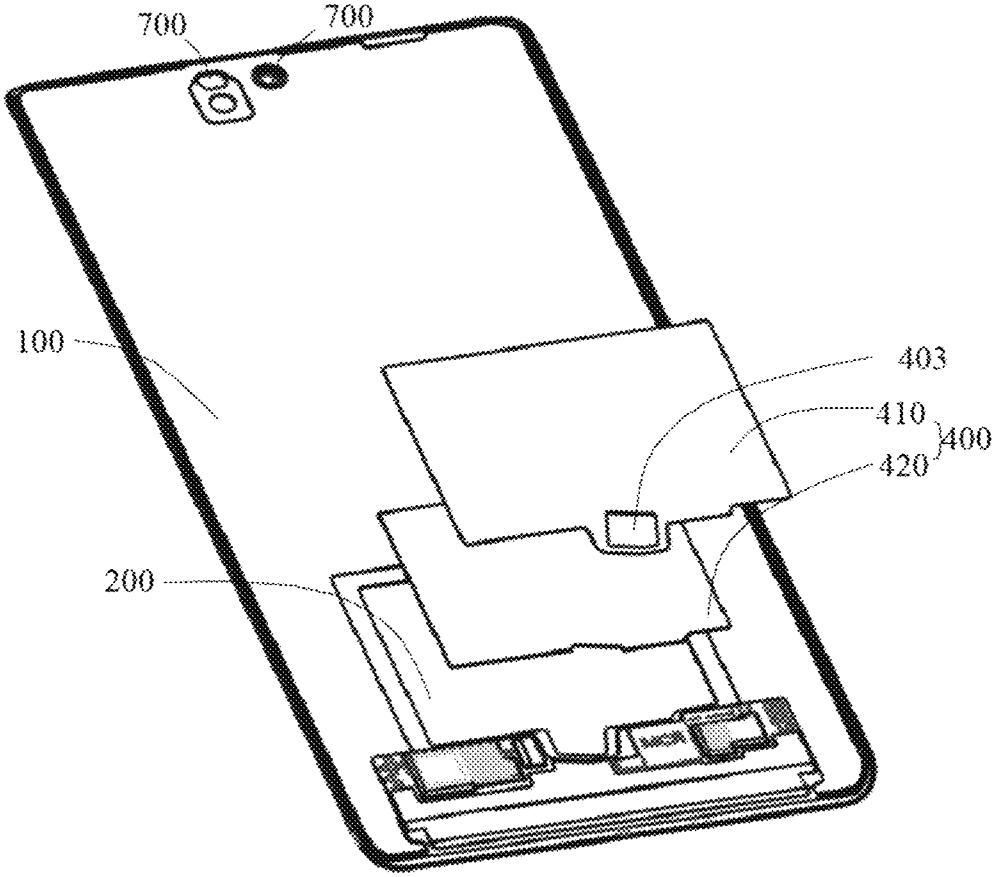
FIG. 5 is an exploded view of a blocking component used when an optical fingerprint module is used according to one of embodiments of the present invention.
Figure 6:
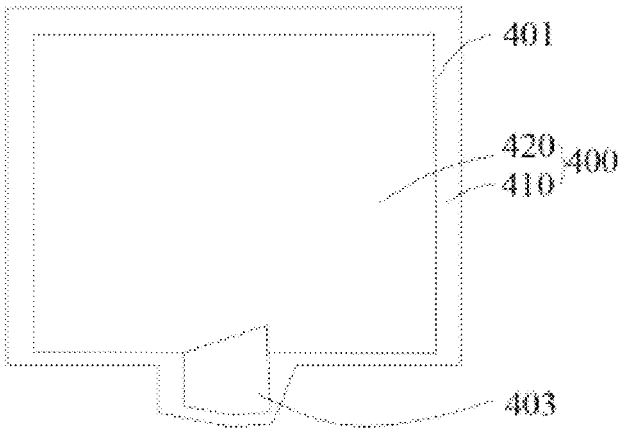
FIG. 6 is an overall structural diagram of a blocking component used when an optical fingerprint module is used according to one of embodiments of the present invention.
Figure 7:
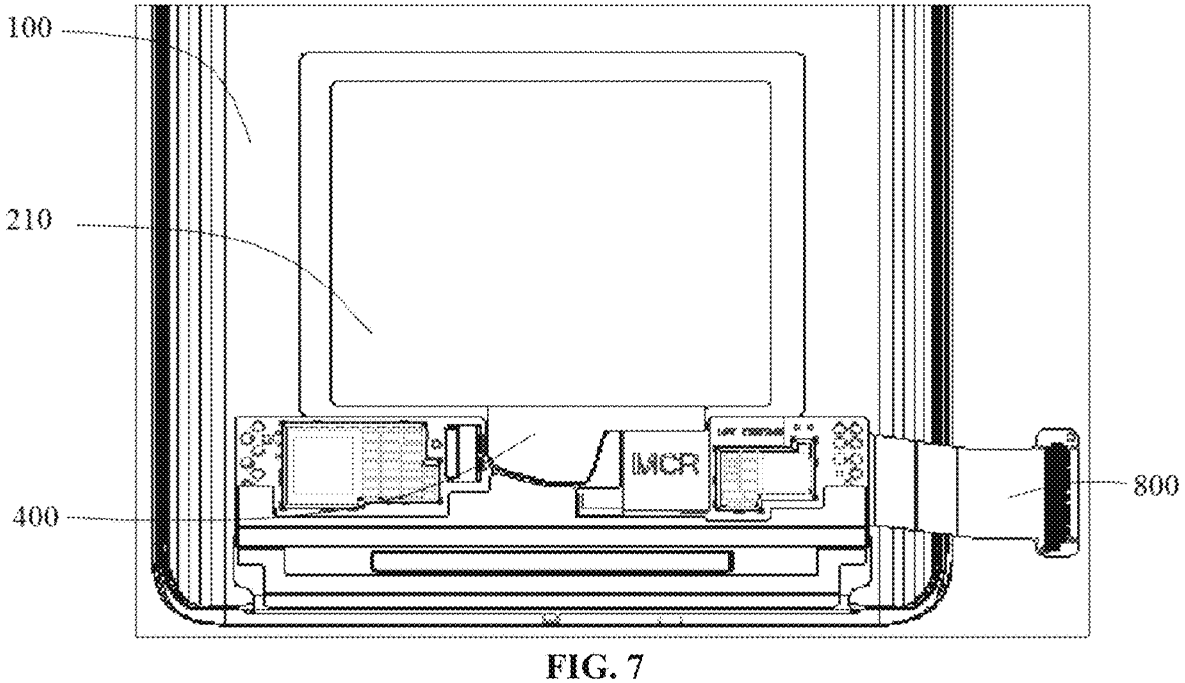
FIG. 7 is a schematic diagram of installing a blocking component when an ultrasonic fingerprint module is used in another embodiment of embodiments of the present invention.
Figure 8:
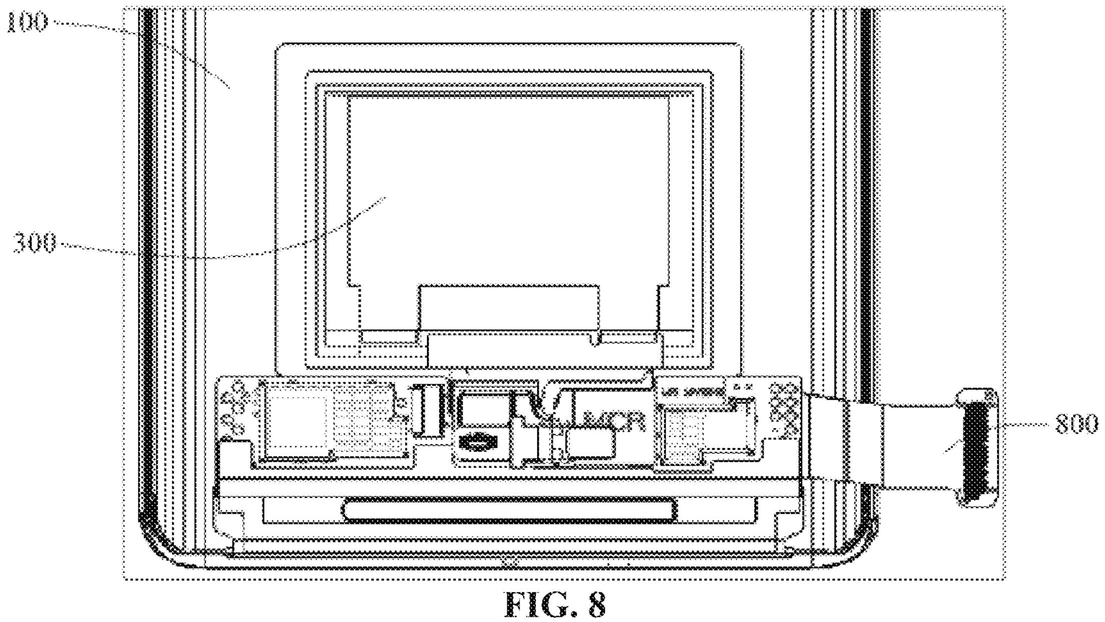
FIG. 8 is a schematic diagram of installing an ultrasonic fingerprint module according to another embodiment of embodiments of the present invention.
Figure 9:
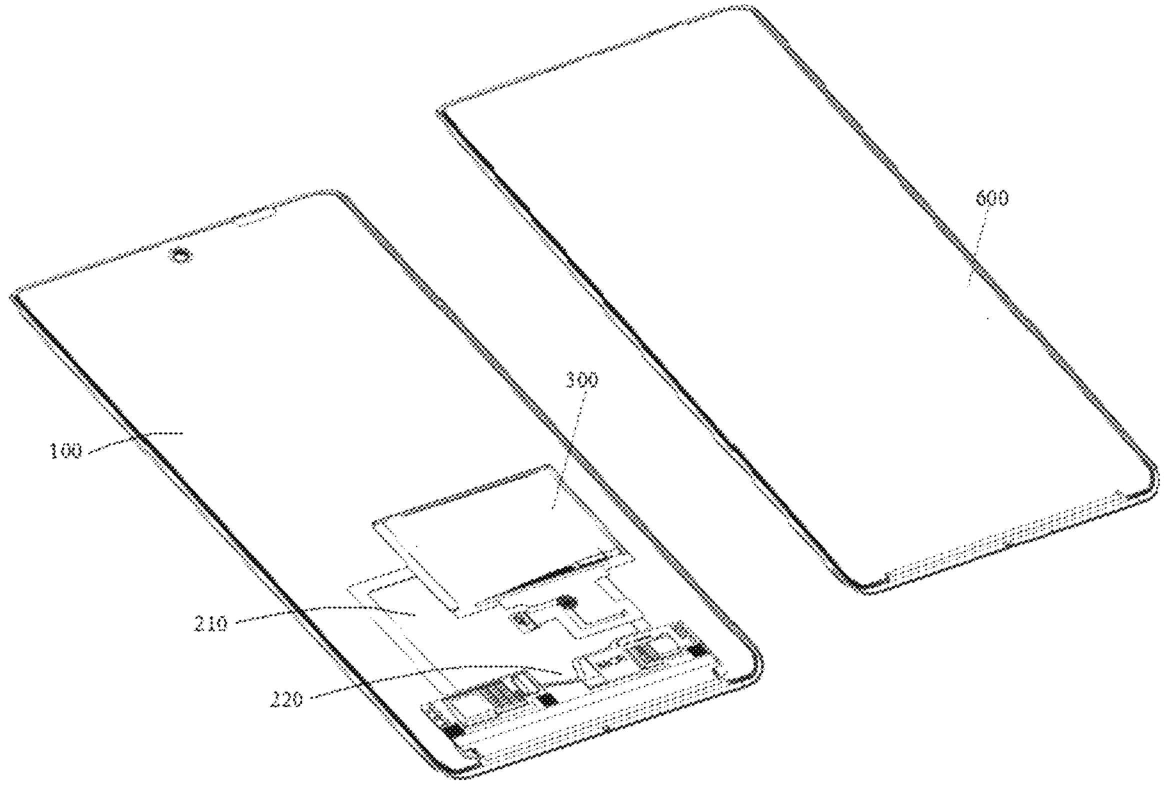
FIG. 9 is an exploded diagram of an electronic device when an ultrasonic fingerprint module is used in another embodiment of embodiments of the present invention.
Figure 10:
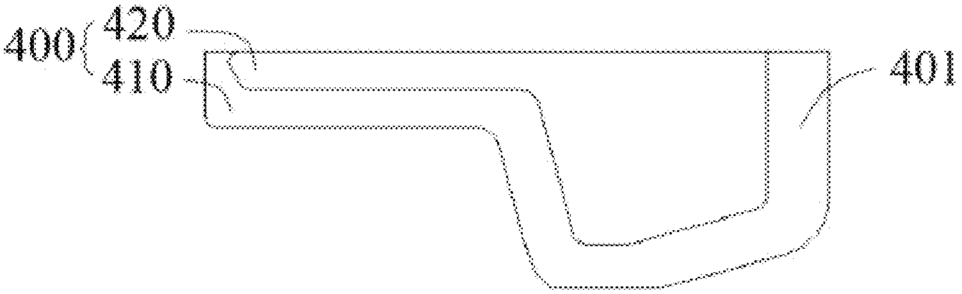
FIG. 10 is an overall structural diagram of a blocking component used when an ultrasonic fingerprint module is used in another embodiment of embodiments of the present invention.
Figure 11:
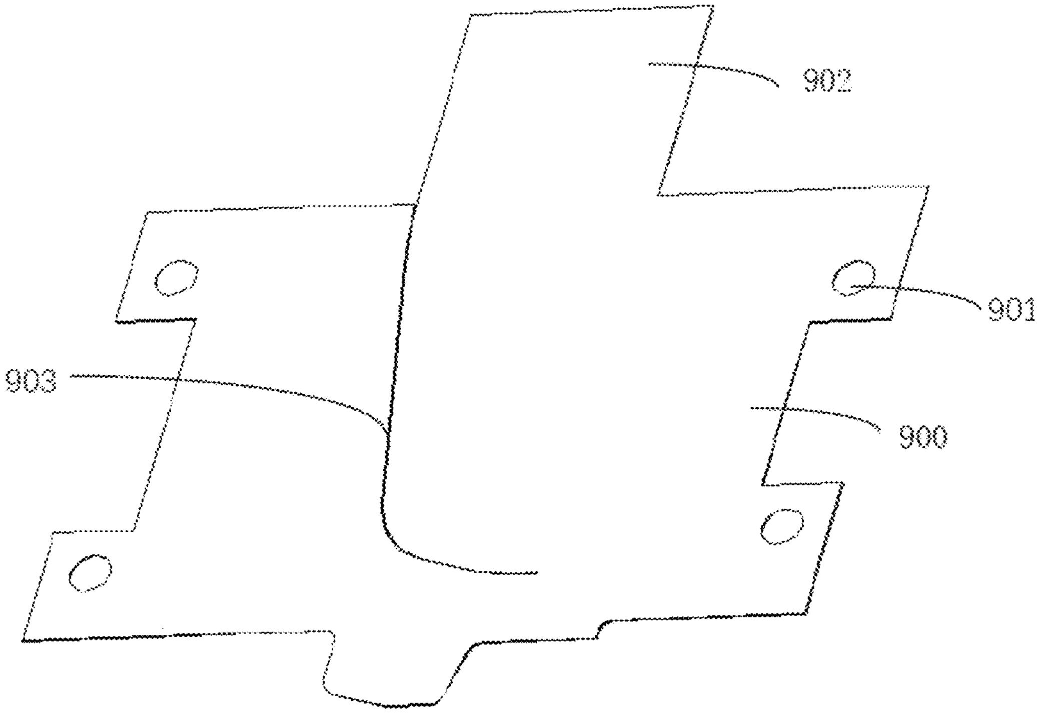
FIG. 11 is a structural diagram of a release film according to one of embodiments of the present invention.
Figure 12:
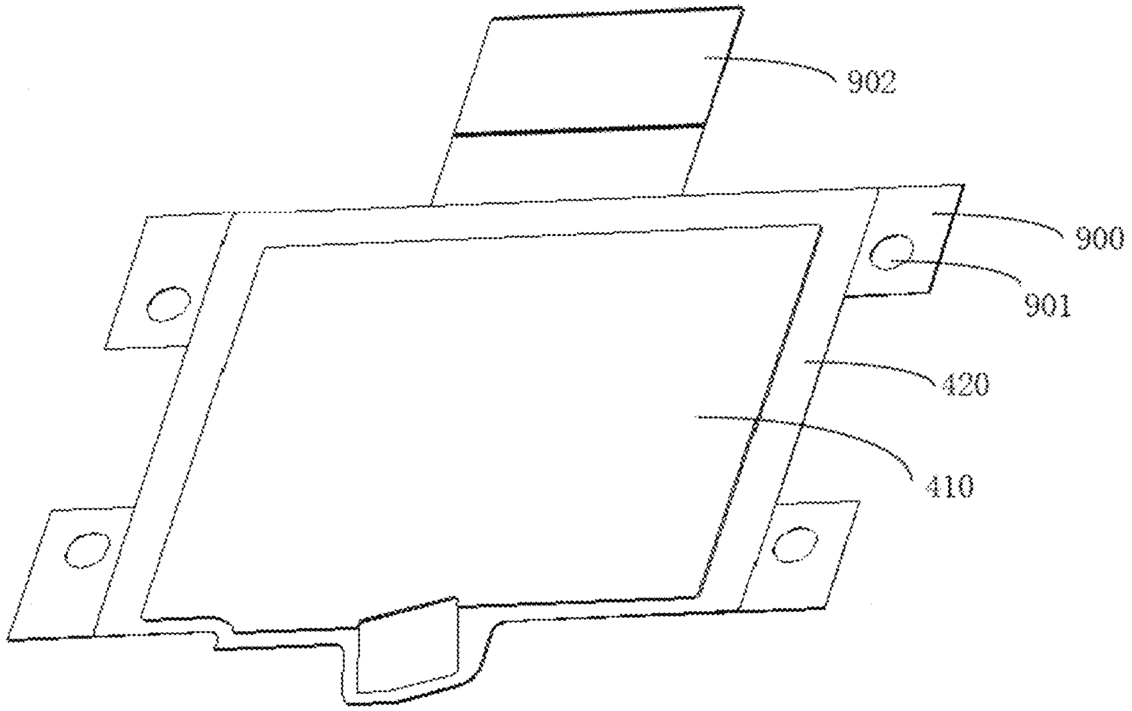
FIG. 12 is a structural diagram of a release film in another embodiment of embodiments of the present invention.

Specifically, the first through hole and the second through hole are located in the orthographic projection of the third through hole in the thickness direction of the electronic device, and the first through hole is located in the orthographic projection of the second through hole in the thickness direction of the electronic device. In this way, sealing performance may be improved when the functional component is disposed. Specifically, as shown in FIG. 1 and FIG. 2, a third projection, on the support layer 150, of the third through hole is the foregoing orthographic projection. The second through hole is located in the third projection, and a part, in the third projection, of the support layer 150 forms a first sealing edge 201. The first sealing edge 201 surrounds the second through hole. When the functional component matches the first hollowed-out region 200, no matter whether the functional component is disposed in the first hollowed-out region 200 or is disposed outside the first hollowed-out region 200, a peripheral edge of a surface, facing the first hollowed-out region 200, of the functional component may be bonded to the first sealing edge 201, to form sealing between the functional component and the first hollowed-out region 200. In this sealing manner, waterproof and dust-proof performance can be implemented. In addition, when the user watches with the electronic device, a gap between the functional component and the first hollowed-out region 200 may be removed due to a blocking action of the first sealing edge 201. Further, the user cannot see an internal structure of the electronic device, and appearance performance of the electronic device is enhanced.

It should be noted herein that the orthographic projection of the second through hole in the thickness direction of the electronic device may also accommodate the first through hole. To be specific, a cross-sectional area of the second through hole may also be greater than a cross-sectional area of the first through hole. In this way, the formed first sealing edge 201 may be supported by both the bonding layer 130 and the bonding layer 140, and a "cantilever" structure does not occur, ensuring stability and fastness during installation of the functional component.

Optionally, the functional component may include an optical fingerprint module 500 and an ultrasonic fingerprint module 300. The optical fingerprint module 500 and the ultrasonic fingerprint module 300 may be disposed side by side in the device body 600.

Specifically, both the optical fingerprint module 500 and the ultrasonic fingerprint module 300 may be disposed in the device body 600, and the optical fingerprint module 500 and the ultrasonic fingerprint module 300 are sequentially disposed in a second direction. The second direction intersects the thickness direction of the electronic device. For example, the second direction is perpendicular to the thickness direction of the electronic device. In this way, the optical fingerprint module 500 and the ultrasonic fingerprint module 300 do not block or interfere with each other to affect a function of the optical fingerprint module 500 and a function of the ultrasonic fingerprint module 300. Of course, a distance from the optical fingerprint module 500 to the screen component and a distance from the ultrasonic fingerprint module 300 to the screen component may be equal or not equal. In some cases, because the optical fingerprint module 500 needs to be relatively close to the screen component due to a performance parameter of the optical fingerprint module 500, the distance from the optical fingerprint module 500 to the screen component and the distance from the ultrasonic fingerprint module 300 to the screen component may be not equal. The distance from the optical fingerprint module 500 to the screen component and the distance from the ultrasonic fingerprint module 300 to the screen component may be determined based on actual parameters. The optical fingerprint module 500 may implement an operation such as fingerprint unlocking in a manner of perceiving light, and the ultrasonic fingerprint module 300 may implement a fingerprint unlocking operation in a manner of ultrasound or the like. It can be learned that the first hollowed-out region 200 may enable both the optical fingerprint module 500 and the ultrasonic fingerprint module 300 to better match the screen component 100, so that different fingerprint unlocking manners are implemented for the electronic device.

Optionally, as shown in FIG. 2, the first hollowed-out region 200 may include a first sub-region 210 and a second sub-region 220.

The ultrasonic fingerprint module 300 may be disposed in the first sub-region 210, and the ultrasonic fingerprint module 300 is connected to the touch layer 120 through an adhesive layer. Disposing of the adhesive layer may enable the ultrasonic fingerprint module 300 to be firmly bonded to the touch layer 120, ensuring that the ultrasonic fingerprint module 300 and the touch layer 120 are fastened at a relative position. In addition, it should be noted that a thickness of the adhesive layer may be large. In this disposing manner, fastness of a connection may be ensured, and a spacing between the ultrasonic fingerprint module 300 and the touch layer 120 may be adjusted, to enable the ultrasonic fingerprint module 300 to be closer to the device body 600. In this way, the user does not observe the ultrasonic fingerprint module 300 from the screen component 100 while the ultrasonic fingerprint module 300 is ensured to be used effectively, to ensure appearance performance of the electronic device.

The optical fingerprint module 500 may be disposed in the second sub-region 220, and the optical fingerprint module 500 may be connected to the touch layer 120 through a first light blocking layer and a first protective layer. The first light blocking layer may be foam cotton. Disposing of the foam cotton may remove interference of stray light, and a problem that light enters the cover plate layer 110 because the first hollowed-out region 200 is hollowed-out at a large area, causing penetration may be further resolved. The first protective layer may be manufactured by polyethylene terephthalate plastic (PET plastic film), to implement support, shape fastening, dust resistance, water resistance, and the like for the first light blocking layer.

Further, a plane, facing the heat dissipation layer 160, of the first light blocking layer may be coplanar with a plane, facing the heat dissipation layer 160, of the support layer 150, and a plane, facing the device body 600, of the first protective layer may be coplanar with a plane, facing the device body 600, of the heat dissipation layer 160. To be specific, the first light blocking layer may be disposed in the second through hole and reuses a superposing height with the support layer 150; and the first protective layer may be disposed in the third through hole and reuses a superposing height with the heat dissipation layer 160. In the coplanar disposing manner, it can be ensured that there is no segment difference in splicing between the first light blocking layer and the support layer 150 and splicing between the first protective layer and the heat dissipation layer 160, further ensuring sealing performance and light blocking performance.

More specifically, the ultrasonic fingerprint module 300 functions through ultrasound. Therefore, the thickness of the adhesive layer should meet ultrasonic penetration and ensure that ultrasonic can be transmitted to the ultrasonic fingerprint module 300 through the adhesive layer. The optical fingerprint module 500 needs to be irradiated with enough light during use. Therefore, the first light blocking layer and the first protective layer should have specific light transmission performance. In this application, a fourth through hole is disposed at the first light blocking layer and the first protective layer, and the optical fingerprint module 500 faces the touch layer 120 through the fourth through hole. The fourth through hole is disposed between the touch layer 120 and the optical fingerprint module 500. Light may enter the optical fingerprint module 500 by sequentially passing through the cover plate layer 110, the touch layer 120, and the fourth through hole, to ensure normal use of the optical fingerprint module 500. Of course, the optical fingerprint module 500 may alternatively be disposed in the fourth through-hole. Details are not described herein.

In some other optional implementations, the electronic device may further include a blocking component 400. The blocking component 400 may be disposed on a side, facing the functional component, of the screen component 100, and the blocking component 400 may block at least a part of the first hollowed-out region 200. The blocking component 400 can minimize a non-luminous part of the screen component provided with the first hollowed-out region on the basis of retaining an original screen appearance and function, to effectively improve flexibility of application of the screen component 100 and greatly improve a use value of the screen component 100.

Optionally, the blocking component 400 may partially block the first hollowed-out region 200, and the blocking component 400 may cooperate with the functional component. A specific cooperation manner is as follows.

In an embodiment, when the ultrasonic fingerprint module 300 is located in the first sub-region 210 and the optical fingerprint module 500 is located in the second sub-region 220, the blocking component 400 may not be disposed if the entire first hollowed-out region 200 is filled. If a relatively large area is provided for the first hollowed-out region 200, that is, a third sub-region in which no other functional component is placed is included in the first hollowed-out region 200 in addition to the first sub-region 210 in which the ultrasonic fingerprint module 300 is placed and the second sub-region 220 in which the optical fingerprint module 500 is placed. The blocking component 400 may be used to block a gap between the ultrasonic fingerprint module 300 and the first sub-region 210, a gap between the optical fingerprint module 500 and the second sub-region 220, and the third sub-region. In this way, the electronic device may have good appearance performance while normal use of the functional component is ensured.

In another embodiment, as shown in FIG. 7 to FIG. 10, when the electronic device uses only the ultrasonic fingerprint module 300, the ultrasonic fingerprint module 300 may be disposed in the first sub-region 210, and the blocking component 400 is disposed in the second sub-region 220. In this embodiment, the optical fingerprint module 500 may also be disposed in the second sub-region 220. However, due to blocking of the blocking component 400, the optical fingerprint module 500 cannot obtain light from the screen component, affecting normal operation of the optical fingerprint module 500. Of course, to ensure spatial utilization of the device body 600, the optical fingerprint module 500 may not be disposed in the second sub-region 220.

In still another embodiment, as shown in FIG. 3 to FIG. 6, when the electronic device uses only the optical fingerprint module 500, the optical fingerprint module 500 may be disposed in the second sub-region 220, and the blocking component 400 is disposed in the first sub-region 210. In this embodiment, the ultrasonic fingerprint module 300 may also be disposed in the first sub-region 210. However, due to blocking of the blocking component 400, the ultrasonic fingerprint module 300 cannot obtain fingerprint data from the screen component 100, affecting normal operation of the ultrasonic fingerprint module 300. Of course, to ensure spatial utilization of the device body 600, the ultrasonic fingerprint module 300 may not be disposed in the first sub-region 210. In addition, in a case that only the optical fingerprint module 500 is used, because a volume of and an occupied region for the optical fingerprint module 500 are relatively small, the optical fingerprint module 500 cannot fill all the second sub-region 220. In this case, while the blocking component 400 blocks and fills the first sub-region 210, the blocking component 400 further needs to fill the gap between the second sub-region 220 and the optical fingerprint module 500. In this disposing manner, an avoidance hole 403 may be provided at the blocking component 400. The avoidance hole 403 is located in the second sub-region 220 and is sleeved on a periphery of the optical fingerprint module 500. A part that is located in the second sub-region 220 and surrounds the avoidance hole 403 and that is of the blocking component 400 may fill the gap between the second sub-region 220 and the optical fingerprint module 500.

Optionally, the blocking component 400 may also entirely block the first hollowed-out region 200, and the blocking component 400 may cooperate with the functional component. A specific cooperation manner is as follows.

In an embodiment, when the optical fingerprint module 500 is disposed in the second sub-region 220, and the ultrasonic fingerprint module 300 is disposed in the first sub-region 210, only because the blocking component 400 entirely blocks the first hollowed-out region 200, the ultrasonic fingerprint module 300 cannot obtain fingerprint data from the screen component 100, affecting normal operation of the ultrasonic fingerprint module 300, and the optical fingerprint module 500 cannot obtain light from the screen component 100, affecting normal operation of the optical fingerprint module 500. Of course, to ensure spatial utilization of the device body 600, the ultrasonic fingerprint module 300 and the optical fingerprint module 500 may not be respectively disposed in the first sub-region 210 and the second sub-region 220. In this way, the blocking component 400 is used to fill and block the entire first hollowed-out region 200, to ensure appearance performance of the electronic device.

In addition, it should be noted that a shape of the blocking component 400 is not specifically required in this application. A design principle is that the blocking component 400 can match a contour that is in the first hollowed-out region 200 and that needs to be blocked, to achieve a purpose of blocking out light. Therefore, a contour shape of the blocking component 400 may be shown in FIG. 6 or FIG. 10 or may be any other shape. Details are not described herein.

Optionally, the blocking component 400 may include a second blocking layer 420 and a second protective layer 410. The second blocking layer 420 may be a cotton foam layer to achieve a purpose of blocking out light, and the second protective layer 410 may be polyethylene terephthalate plastic (PET plastic film) to achieve purposes of support, shape fastening, and complete sealing. Specifically, the second blocking layer 420 may be disposed on the second protective layer 410, the second blocking layer 420 faces the first hollowed-out region 200, and an orthographic projection of the second protective layer 410 in the thickness direction of the electronic device may accommodate the second blocking layer 420.

Further, the second blocking layer 420 may have a same shape and contour as a shape and contour of the second protective layer 410, and a cross-sectional area of the second protective layer 410 is equal to a cross-sectional area of the second blocking layer 420. Of course, the cross-sectional area of the second protective layer 410 may alternatively be greater than the cross-sectional area of the second blocking layer 420. In this case, the second blocking layer 420 forms a first projection on the second protective layer 410. The first projection is the foregoing orthographic projection. A part that surrounds the first projection and that is of the second protective layer 410 forms a second sealing edge 401. In this way, when the blocking component 400 is installed, the second sealing edge 401 and the first sealing edge 201 may be superposed and bonded, and glue is filled for bonding. In such design, connection fastness of the blocking component 400 may be increased, a sealing effect on the first hollowed-out region 200 can be enhanced, and a better light blocking effect is formed on the screen component 100.

Optionally, the blocking component 400 further has a release film 900, and the second blocking layer 420 is connected to the release film 900 through the second protective layer 410. When the blocking component 400 is installed at a specified position of the first hollowed-out region 200, the release film 900 provided with the second blocking layer 420 and the second protective layer 410 may be installed in the first hollowed-out region 200, and then the release film 900 is separated from the second protective layer 410, so that the blocking component 400 can be retained in the first hollowed-out region 200. In this way, an operation of disposing the blocking component 400 in the first hollowed-out region can be facilitated. A positioning hole 901 is further disposed around the release film 900. While the blocking component 400 is installed in the first hollowed-out region 200, the blocking component 400 may be clamped by using a gripper. The gripper clamps, by using the positioning hole 901, the release film provided with the second blocking layer 420 and the second protective layer 410, and transfers the release film 900 to the first hollowed-out region 200 of the screen component 100. Optionally, a disassembly line 903 is disposed on the release film 900. After the blocking component 400 is installed in a specified region, the release film 900 is separated from the second protective layer 410. Optionally, a strong/weak adhesive 902 is disposed at the top of the release film 900. A weak adhesive surface is attached to a protective film provided for the screen. After the protective film provided for the screen is torn, the release film 900 is also automatically removed. In this way, the screen may be prevented from being damaged when the release film is removed.

In some other optional implementations, the functional component may alternatively be a camera module and/or an infrared module. In this case, the screen component 100 may further include a second hollowed-out region 700, and the functional module may face the second hollowed-out region 700. It can be learned that disposing of the second hollowed-out region 700 may enable layout positions of the camera module and/or the infrared module to match the screen component 100, further improving the compatibility of the electronic device.

Further, the electronic device may further include a screen component FPC 800. The screen component FPC 800 is disposed on a side, facing the device body 600, of the screen component 100. The screen component FPC 800 may provide electrical energy for normal operation of the screen component 100. Specifically, a power supply may be disposed in the device body 600, and the screen component 100 may be electrically connected to the device body 600 by using the screen component FPC 800. In this way, electrical energy of the power supply may be transmitted to the screen component 100, so that the screen component 100 performs display normally, and the user may perform an operation such as touch on the screen component 100.

The foregoing descriptions are merely embodiments of this application, and are not intended to limit this application. Various changes and modifications may be made to this application by a person skilled in the art. Any modifications, equivalent substitutions, improvements, and the like made within the spirit and principle of this application should be included within the scope of the claims of this application.

The invention claimed is:

1. An electronic device, comprising a screen component, one or more functional components, and a device body, wherein the screen component is superposed and installed on the device body, and a first hollowed-out region is provided on the screen component, and the functional component is disposed in the device body, the functional component faces the first hollowed-out region, and an orthographic projection of the first hollowed-out region in a thickness direction of the electronic device is configured to accommodate at least two of the functional components;

wherein the screen component is a flexible screen component, and the flexible screen component comprises a cover plate layer, a touch layer, a bonding layer, a support layer, and a heat dissipation layer that are sequentially superposed, wherein the cover plate layer is disposed away from the device body, and the first hollowed-out region is provided on the bonding layer, the support layer, and the heat dissipation layer;

wherein a first through hole is provided at the bonding layer, a second through hole is provided at the support layer, and a third through hole is provided at the heat dissipation layer, an orthographic projection of the third through hole in the thickness direction of the electronic device is configured to accommodate the first through hole and the second through hole, an area of an orthographic projection of the second through hole in the thickness direction of the electronic device is greater than or equal to an area of an orthographic projection of the first through hole in the thickness direction of the electronic device, such that a part of the support layer forms a first sealing edge surrounding the second through hole, and the first through hole, the second through hole, and the third through hole are connected to each other to define the first hollowed-out region.

2. The electronic device according to claim 1, wherein the functional component comprises an optical fingerprint module and an ultrasonic fingerprint module, and the optical fingerprint module and the ultrasonic fingerprint module are disposed side by side in the device body.

3. The electronic device according to claim 2, wherein the first hollowed-out region comprises a first sub-region and a second sub-region, the ultrasonic fingerprint module may be disposed in the first sub-region, the ultrasonic fingerprint module is connected to the touch layer through an adhesive layer, the optical fingerprint module may be disposed in the second sub-region, and the optical fingerprint module is connected to the touch layer through a first light blocking layer and a first protective layer, wherein a plane, facing the heat dissipation layer, of the first light blocking layer is coplanar with a plane, facing the heat dissipation layer, of the support layer, and a plane, facing the device body, of the first protective layer is coplanar with a plane, facing the device body, of the heat dissipation layer.

4. The electronic device according to claim 3, wherein a fourth through hole is provided at the first light blocking layer and the first protective layer, the optical fingerprint module faces the touch layer through the fourth through hole, and light may enter the optical fingerprint module by sequentially passing through the cover plate layer, the touch layer, and the fourth through hole.

5. The electronic device according to claim 1, wherein the electronic device further comprises a blocking component, the blocking component is disposed on a side of the screen component facing the functional component, the blocking component blocks at least a part of the first hollowed-out region, and the blocking component is configured to block light to enter the functional component through the screen component.

6. The electronic device according to claim 5, wherein the blocking component comprises a second blocking layer and a second protective layer, the second blocking layer is disposed on the second protective layer, the second blocking layer faces the first hollowed-out region, and an orthographic projection of the second protective layer in the thickness direction of the electronic device is configured to accommodate the second blocking layer.

7. The electronic device according to claim 1, wherein the screen component further comprises a second hollowed-out region, and in a case that the functional component is a camera module and/or an infrared module, the functional module faces the second hollowed-out region.

8. The electronic device according to claim 1, wherein the electronic device further comprises a screen component FPC, the screen component FPC is electrically connected to the screen component to provide electrical energy for normal operation of the screen component, and the screen component FPC is disposed on a side of the screen component facing the device body.

* * * * *